United States Patent
Furuhjelm

(10) Patent No.: US 8,499,120 B2
(45) Date of Patent: Jul. 30, 2013

(54) USER SELECTABLE CACHING MANAGEMENT

(75) Inventor: Martin R. Furuhjelm, Grass Valley, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 766 days.

(21) Appl. No.: 12/508,895

(22) Filed: Jul. 24, 2009

(65) Prior Publication Data

US 2010/0100675 A1    Apr. 22, 2010

Related U.S. Application Data

(60) Provisional application No. 61/106,236, filed on Oct. 17, 2008.

(51) Int. Cl.
*G06F 13/00* (2006.01)

(52) U.S. Cl.
USPC .......................... 711/118; 711/126; 711/145

(58) Field of Classification Search
USPC ........................................................ 711/118
See application file for complete search history.

(56) References Cited

U.S. PATENT DOCUMENTS

| | | | |
|---|---|---|---|
| 6,032,227 A | 2/2000 | Shaheen et al. | |
| 2002/0029354 A1 | 3/2002 | Forehand et al. | |
| 2002/0069322 A1 | 6/2002 | Galbraith et al. | |
| 2002/0124132 A1 | 9/2002 | Haines et al. | |
| 2003/0061444 A1 | 3/2003 | Herbst et al. | |
| 2003/0149815 A1 | 8/2003 | Williams et al. | |
| 2004/0193801 A1 | 9/2004 | Benhase et al. | |
| 2006/0143407 A1* | 6/2006 | Humlicek | 711/143 |
| 2006/0265549 A1 | 11/2006 | Chapel et al. | |
| 2007/0283086 A1 | 12/2007 | Bates | |
| 2008/0005614 A1 | 1/2008 | Lubbers et al. | |
| 2008/0120469 A1 | 5/2008 | Kornegay et al. | |
| 2008/0162795 A1 | 7/2008 | Hsieh et al. | |
| 2008/0172531 A1 | 7/2008 | Liu et al. | |
| 2008/0244173 A1 | 10/2008 | Takai | |
| 2008/0244181 A1 | 10/2008 | Walz et al. | |
| 2008/0294846 A1 | 11/2008 | Bali et al. | |
| 2009/0055590 A1 | 2/2009 | Takahashi | |
| 2009/0100224 A1 | 4/2009 | Wang | |

OTHER PUBLICATIONS

O&O CleverCache Professional Edition. Jun. 17, 2009 <http:win.eeedownload.asus.com/UK/software/o&o-clevercache-professional-edition-5282...>.
"Cache Circuitry and Operation", The PC Guide, Site Version: 2.2.0-Version Date: Apr. 17, 2001. Accessed on Jun. 17, 2009 <http://www.pcguide.com/ref/hdd/op/cacheCircuitry-c.html>.

(Continued)

*Primary Examiner* — Reba I Elmore
(74) *Attorney, Agent, or Firm* — Cesari & Reed, LLP; Kirk A. Cesari; Christian W. Best

(57) ABSTRACT

A data storage device can include at least one non-volatile storage medium, at least one data cache, and a controller configured to perform cache writing operations between the at least one non-volatile storage medium and the at least one data cache based on user-selected caching modes. Also presented is a user interface that can be configured to selectively enable and disable one or more caching modes, which selection of a caching mode directs cache writing operations performed by a controller. In some examples, a caching mode can be selected in a manner that is independent of a host computer system.

20 Claims, 3 Drawing Sheets

OTHER PUBLICATIONS

Cacheman—The Disk Cache Management Tool, Cacheman 5.50. Jun. 17, 2009 <http://www.qweas.com/download/system/system_diagnostics/cacheman.htm>.

Cacheman—Optimize your Disk Cache, Name and So on, Cacheman 5.50—Screenshots, Jun. 17, 2009.<http://www.qweas.com/download/system/system_diagnostics/cacheman_screen.htm>.

* cited by examiner

USER SELECTABLE CACHING MANAGEMENT

BACKGROUND

The present disclosure is directed to data storage devices. In particular, the present disclosure is directed to cache management systems for data storage devices.

Data storage devices, such as magnetic disk drives, optical disk drives, hybrid drives, and solid state drives are used to store data for subsequent retrieval. Such devices employ data caches, which are typically high-speed semiconductor memory chips that enable the devices to rapidly manage the data and commands received from a host computer. Without caching, all read and write commands from the host computer would result in an access to the mass storage medium, such as a magnetic disk. This may result in significant time latencies due to mechanical positioning of the head relative to the magnetic disk. By caching, the storage device can buffer data that is likely to be accessed by the host computer so that when the data is actually accessed, the data is made available more quickly.

SUMMARY

An aspect of the present disclosure is directed to a data storage device that includes at least one non-volatile storage medium, at least one data cache, and a controller configured to perform reading and writing operations between the at least one non-volatile storage medium and a host computer system, and further configured to perform cache writing operations between the at least one non-volatile storage medium and the at least one data cache. The data storage device also includes a cache management system that includes at least one user-selectable caching mode configured to the direct the cache writing operations performed by the controller.

Another aspect of the present disclosure is directed to a data storage device that includes at least one non-volatile storage medium, at least one data cache, and a controller configured to perform reading and writing operations, where the writing operations include cache writing operations from the at least one non-volatile storage medium to the at least one data cache. The data storage device also includes a user interface in signal communication with the controller and configured to enable and disable at least one caching mode that is configured to direct the caching writing operations performed by the controller.

Another aspect of the present disclosure is directed to a method for using a data storage device. The method includes providing a plurality of caching modes for performing cache writing operations from at least one non-volatile storage medium of the data storage device to at least one data cache of the data storage device. The method also includes receiving a selection of one of the plurality of caching modes from a user interface, reading data blocks from the at least one non-volatile storage medium, and writing at least a portion of the read data blocks to the at least one data cache pursuant to the selected caching mode.

DETAILED DESCRIPTION

The present disclosure is directed to a data storage device having a caching management system (CMS) that allows a user to interactively control and monitor the data caching operations of the device. As discussed below, the CMS may include a plurality of user-selectable caching modes, where each caching mode includes an algorithm for caching data. This allows the user to modify performance of the data storage device and an associated host computer system based on the particular needs and desires of the user. This is in comparison to caching selections that rely solely on system-controlled caching algorithms. Such algorithms are typically based on statistical results (e.g., cache hit rates) rather than particular needs of individual users.

Figure 1:
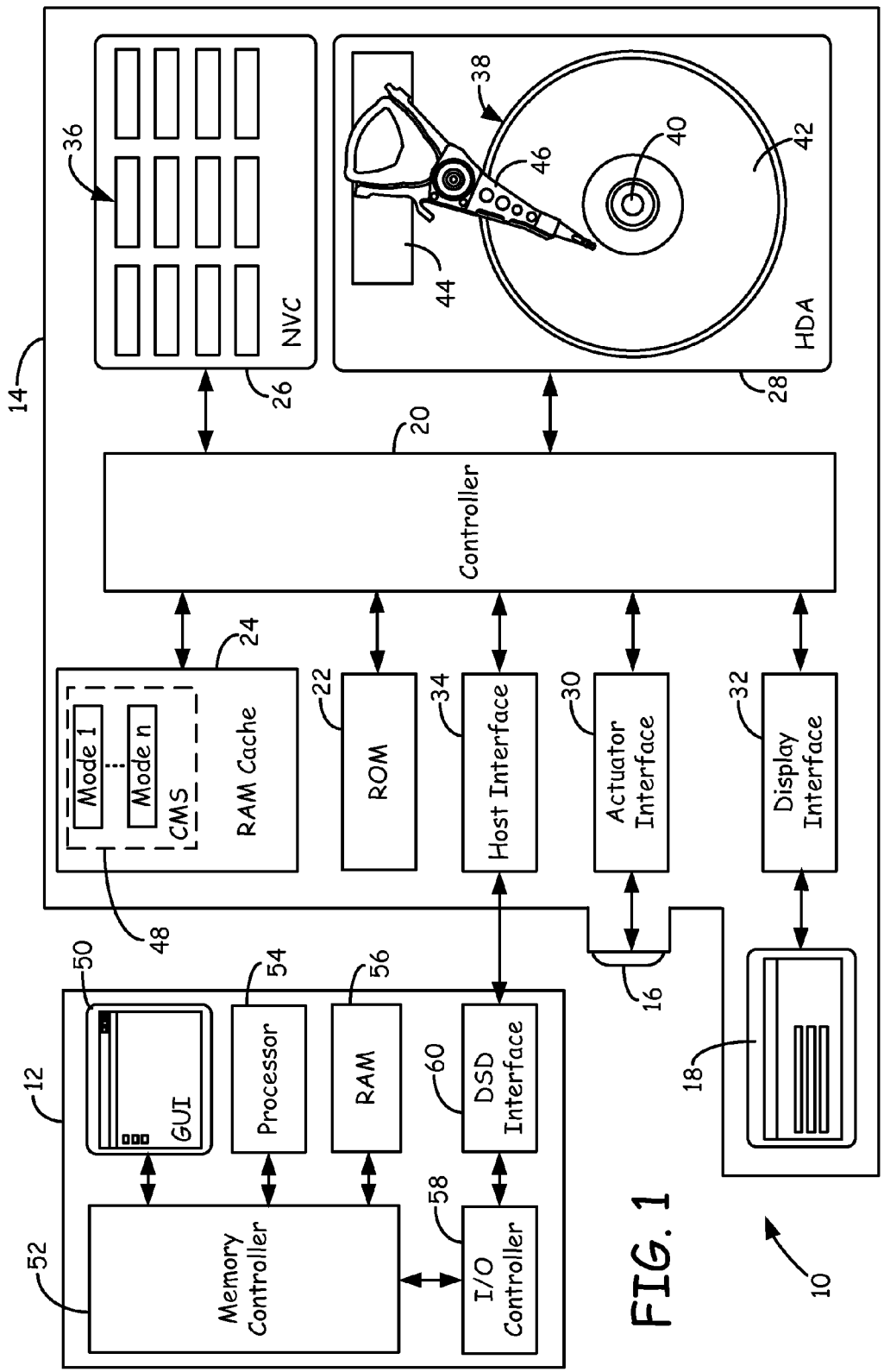
FIG. 1 is a schematic illustration of a data storage device in use with a host computer, where the data storage device includes a cache management system having user-selectable caching modes.

FIG. 1 shows storage device 10 in use with host computer 12, where host computer 12 may be one or more computer-based systems configured to engage with storage device 10. Storage device 10 is an example of a suitable data storage device of the present disclosure, and includes housing 14, actuator 16, display unit 18, controller 20, ROM module 22, RAM cache 24, non-volatile cache (NVC) 26, and head disk assembly (HDA) 28. Housing 14 is an exterior casing for storage device 10, which desirably encases and retains the interior components, such as one or more of controller 20, ROM module 22, RAM cache 24, NVC 26, and HDA 28. Accordingly, storage device 10 may be internal or external to a casing of host computer 12.

Actuator 16 is a user interface (e.g., a push-button user interface) for storage device 10 that is retained by housing 14 and communicates with controller 20 over actuator interface 30. As discussed below, actuator 16 may be activated (e.g., pressed) by a user to select different caching modes for operating storage device 10. This allows the user to interact directly with storage device 10 to select which caching mode the user prefers storage device 10 to operate under. While actuator 16 is illustrated in FIG. 1 as a single press-button, storage device 10 may include a variety of different user interfaces for allowing a user to select different caching modes.

These user interfaces (e.g., actuator 16) desirably operate independently of host computer 12. This allows the user to select caching modes for storage device 10 while access to host computer 12 is unavailable, such as during early stages of a startup sequence. For example, as discussed below, during the initial boot sequence for starting host computer 12 (e.g., after the power-on self test), the user may select a caching mode with actuator 16 that directs controller 20 to cache all data read from HDA 28. This allows data read from a startup sequence of HDA 28 (e.g., including a boot sector) to be cached for subsequent use. Pinning this cached data in a non-volatile cache (e.g., NVC 26) may reduce subsequent startup times by allowing controller 20 to read the startup sequence data from NVC 26 rather than from the slower HDA 28. Furthermore, this choice of whether to cache the startup sequence data may be determined entirely by the user.

Display unit 18 is a visual display unit retained by housing 14 in a manner that desirably allows the user to view information relating to the data caching in storage device 10. As shown, display unit 16 communicates with controller 20 over display interface 32. Display unit 18 may include a variety of different units for displaying information to the user, such as liquid-crystal display (LCD) units, light-emitting diode (LED) units, and the like. In one embodiment, display unit 18 may be separate from housing 14, thereby allowing display unit 18 be disposed at a remote location from storage device 10. In this embodiment, display interface 32 may include a communication cable (not shown) that interconnects display unit 18 and controller 20, and/or may include a wireless transmitter/receiver assembly (not shown).

Display unit 18 may provide a variety of different information relating to the data caching in storage device 10, such as percentages of cache used, percentages of cache hits, cache hit rates, free and/or used cache volumes, available caching modes, selected caching modes, and the like. Because this information is viewable directly from storage device 10, display unit 18 may display the information independently of host computer 12. This allows the user to receive caching information even when such information may be unavailable through host computer 12, such as during startup and shut down sequences.

Controller 20 is a circuit assembly that directs the reading and writing operations for storage device 10, and is configured to respectively communicate with ROM module 22, RAM cache 24, NVC 26, and HDA 28. Controller 20 may also communicate with host computer 12 via host interface 34, where host interface 34 may be any suitable interface, such as a universal serial bus (USB) interface, a Serial Advanced Technology Attachment (SATA) interface, an External SATA (eSATA) interface, a Parallel Advanced Technology Attachment (PATA) interface, an IEEE 1394 interface, a Small Computer System Interface (SCSI), a Serial Attached SCSI (SAS) interface, an Integrated Drive Electronics (IDE) interface, a Fiber Channel interface, and the like.

ROM module 22 is one or more non-volatile memory modules (e.g., read-only memory) for storing information such as firmware. RAM cache 24 is one or more volatile memory modules (e.g., dynamic random access memory) that may function as a volatile data cache during reading and/or writing operations with HDA 28 (i.e., a volatile disk buffer). NVC 26 is one or more solid state, non-volatile memory modules, such as flash memory, magnetic random access memory (MRAM), electrically erasable programmable read-only memory (EEPROM), ferroelectric random access memory (FeRAM), and combinations thereof. NVC 26 includes a plurality of erasable data blocks (referred to as data blocks 36) for storing data, and desirably functions as a non-volatile data cache during reading and/or writing operations with HDA 28 (i.e., a non-volatile disk buffer).

HDA 28 is one or more head disk assemblies, and is the primary storage medium/media for storage device 10. HDA 28 includes storage disk 38 and spindle motor 40, where spindle motor 40 rotates storage disk 38 in a rotational direction during operation. Storage disk 38 includes recordable surface 42, which is a surface of storage disk 38 having multiple data tracks (not shown) for storing data (e.g., startup sequence data). HDA 28 further includes actuation motor 44 (e.g., a voice coil motor) and actuator arm assembly 46, where actuator arm assembly 46 may include an actuator arm, suspension assembly, and slider to carry a transducing head for writing data to, and reading data from, the data tracks in recordable surface 42. Actuation motor 44 is configured to pivot actuator arm assembly 46 about an axis to sweep the transducing head in an arc over recordable surface 42. The operation of HDA 28 is directed by controller 20, where controller 20 may communicate with servo and spindle controls to read from, and write data to, recordable surface 42.

Reading data from, and writing data to, HDA 28 is generally slower than the respective operations with RAM cache 24 and/or NVC 26. This is due in part to the mechanical arrangement of HDA 28, which requires storage disk 38 to spin up and actuator arm assembly 46 to seek the desired data tracks in recordable surface 42. As such, pinning data to RAM cache 24 and/or NVC 26 may increase data retrieval efficiencies by allowing controller 20 to read the cached data directly from RAM cache 24 and/or NVC 26 rather than from the slower HDA 28. Allowing the user to determine which data is to be cached correspondingly provides greater user control over storage device 10 and host computer 12, and allows the performance of storage device 10 to be modified to suit the particular needs and desires of the user.

Storage device 10 also includes CMS 48, which desirably includes a plurality of user-selectable caching modes (e.g., caching mode 1, caching mode 2, . . . , caching mode n) for directing how controller 20 performs cache writing operations from HDA 28 to RAM cache 24 and/or NVC 26. Instructions for instantiating CMS 48 may be stored on any suitable storage medium/media in storage device 10, such as in ROM module 22, NVC 26, and/or HDA 28. When storage device 10 is powered up, CMS 48 is desirably copied from the given storage medium to RAM cache 24. CMS 48 may then direct the cache writing operations that controller 20 performs based on a selected caching mode.

The caching modes of CMS 48 may include a variety of different algorithms for directing controller 20 to perform cache writing operations. Furthermore, the caching modes may be preset caching modes, user-defined caching modes, system-modified caching modes, and combinations thereof. The preset caching modes are predefined caching modes that provide suitable default algorithms for performing cache writing operations, and may be stored in any suitable storage medium of storage device 10, such as ROM module 22, NVC 26, and/or HDA 28. User-defined caching modes are caching modes that users may generate with host computer 12, as discussed below. System-modified caching modes are caching modes that may be modified by storage device 10 and/or host computer 12 based on cache statistical results. Examples of suitable techniques for generating system-modified caching modes based on cache statistical results include those disclosed in Herbst et al., U.S. Patent Application Publication No. 2003/0061444. When generated, the user-defined caching modes and the system-modified caching modes may each be stored in any suitable storage medium of storage device 10, such as NVC 26 and/or HDA 28. The caching modes may then be copied to RAM cache 24 with CMS 48 when storage device 10 is powered up.

As discussed above, the caching modes may define a variety of different algorithms for directing controller 20 to perform cache writing operations from HDA 28 to RAM cache 24 and/or NVC 26. For example, the caching modes may define usable cache volumes, may define optimal operating characteristics for one or more benchmarks, may apply different algorithms for writing data to the data caches (e.g., first-in-last-out algorithms), may allocate portions of the data caches to specific algorithms (e.g., volatile vs. non-volatile storage), and the like.

In one embodiment, the caching modes of CMS 48 may include an active caching mode. As used herein, the term "active caching mode" refers to a caching mode in which a controller (e.g., controller 20) copies and pins all data read from a storage medium (e.g., HDA 28) to one or more data caches of the storage device (e.g., RAM cache 24 and/or NVC 26). As such, in the embodiment shown in FIG. 1, when the user selects the active caching mode, all data that controller 20 reads from recordable surface 42 of HDA 28 for transmission to host computer 12, is also copied and pinned to RAM cache 24 and/or NVC 26. In this embodiment, while the active caching mode in CMS 48 remains selected, controller 20 continues to copy and pin all data read from HDA 28 to RAM cache 24 and/or NVC 26. This may continue until either RAM cache 24 and/or NVC 26 are full, or until the user disables the active caching mode (e.g., the user selects a different caching mode).

In this embodiment, actuator 16 may function as an on/off switch for enabling and disabling the active caching mode. Accordingly, when the user presses actuator 16, controller 20 may be directed to operate under the active caching mode, as discussed above. At a subsequent point in time, when the user desires to disable the active caching mode, the user may press actuator 16 again to select another non-active caching mode, thereby disabling the active caching mode. The non-active caching mode may be one of a variety of caching modes, such as a default preset caching mode. Controller 20 may then perform cache writing operations pursuant to the non-active caching mode.

In addition to functioning as an on/off switch, actuator 16 may also provide additional data caching functions, such as data purging. In this embodiment, after the active caching mode has been enabled and disabled, when the user presses actuator 16 again to re-enable the active caching mode, one or more portions of the previously pinned data may be purged from RAM cache 24 and/or NVC 26. The data purging may empty entire physical regions of RAM cache 24 and/or NVC 26, or may selectively purge data based on criteria. Suitable criteria for data purging include the number of hits, the residence time in RAM cache 24 and/or NVC 26, and the like. The purging of RAM cache 24 and/or NVC 26 in this manner may accordingly free up storage space for subsequent cache writing operations. In one embodiment, the purging operation may be performed by pressing and holding actuator 16 for a predetermined time period (e.g., a few seconds).

Display unit 18 may also indicate whether controller 20 is operating under the active caching mode. For example, when controller 20 is operating under the active caching mode, display unit 18 may provide one or more visual and/or audible indicators, such as a textual indicator stating "ACTIVE CACHING ON", an illuminated LED indicator, an audible sound, and the like. When RAM cache 24 and/or NVC 26 become full, the active caching mode may be disabled, and display unit 18 may provide a corresponding indication, such as "CACHE FULL". Likewise, when the user disables the active caching mode, the display unit 18 may provide a corresponding indication, such as "ACTIVE CACHING OFF".

The active caching mode is particularly suitable for use with hybrid drives (e.g., storage device 10) and solid state drives, each of which desirably includes one or more large-volume, non-volatile caches (e.g., NVC 26). A substantial amount of data may be cached and retained using non-volatile caches having large storage volumes. For example, in embodiments in which NVC 26 has a storage volume of about 32 gigabytes (GB), and controller 20 reads data from HDA 28 at a rate of about 100 megabytes/second, the active caching mode may run for about 5 minutes before data blocks 36 of NVC 26 become full. Similarly, a 250 GB volume for NVC 26 would allow the caching operation under the active caching mode to continue for about 40 minutes before NVC 26 becomes full. Because data is typically re-read from previously cached sectors, the active caching mode may actually continue for greater durations than these examples listed above. As such, providing the user the means to select the active caching mode in combination with large caching volumes allows substantial amounts of data to be pinned to data caches based on the particular needs and desires of the user.

This combination is also suitable for caching startup sequence data, as discussed above. For example, during the initial startup sequence for starting host computer 12 (e.g., after the power-on self test), the user may select the active caching mode with actuator 16, thereby directing controller 20 to cache all data read from HDA 28. This desirably directs controller 20 to copy and pin all startup sequence data to data blocks 36 of NVC 26. When the startup sequence is complete, the user may then press actuator 16 again to select a non-active caching mode (e.g., a default caching mode), thereby disabling the active caching mode. Due to the non-volatile nature of NVC 26, the retained startup sequence data may then be read from NVC 26 during subsequent startup sequences of host computer 12. As discussed above, this may reduce subsequent startup times by allowing controller 20 to read the startup sequence data from NVC 26 rather than from the slower HDA 28.

In comparison, data cache managers that are based on software are generally unsuitable for selectively caching startup sequence data from data storage devices. Such data cache managers typically require the startup sequence of the host computer to be completed before they may be used. This effectively prevents these types of data cache managers from being selectively operated by a user during the startup sequences. Storage device 10 with CMS 48, however, allows the user to selectively cache data during a variety of different power cycles of host computer 12, including startup and shut down sequences.

In addition to actuator 16 and display unit 18, in some embodiments, the user may also select caching modes for controller 20 through host computer 12. In these embodiments, host computer 12 may provide software-based tools for allowing the user to select the caching modes for storage device 10, as well as for reviewing caching statistics and generating user-defined caching modes for CMS 48.

As discussed above, host computer 12 may be one or more computer-based systems configured to engage with storage device 10. Examples of suitable systems for host computer 12 include desktop computers, laptops, server-based systems, personal digital assistants (PDA), telecommunication devices, multimedia players (e.g., portable multimedia players), and combinations thereof. In the embodiment shown in FIG. 1, host computer 12 includes graphical user interface (GUI) 50, memory controller 52, processor 54, RAM 56, input/output (I/O) controller 58, and data storage device (DSD) interface 60. Host computer 12 may also include a variety of additional components that are typically contained in computer-based systems.

GUI 50 is a user interface, such as an operating system interface, that may be instantiated and stored in RAM 56 during operation. Memory controller 52 is a circuit assembly that interfaces the components of host computer 12 with RAM 56, and may include logic for mapping addresses of the components of host computer 12 to particular areas of RAM 56. Processor 54 is one or more processing units, and RAM 56 is one or more volatile random access memory modules. I/O controller 58 is a circuit assembly that interfaces memory controller 52, processor 54, and RAM 56 with various input and output components of host computer 12, including DSD interface 60. DSD interface 60 is the reciprocating interface of host interface 34, which allows storage device 10 to engage and communicate with host computer 12. Suitable interfaces for DSD interface 60 include the reciprocating interfaces for those discussed above for host interface 34. Furthermore, I/O controller 58 and/or the DSD interface 60 may include logic to support RAID technology, thereby allowing storage device 10 to operate using RAID technology.

The user may interact with CMS 48 via host computer 12 through a software application that may be instantiated and stored in RAM 56, and displayed in GUI 50. The software application may be instantiated in host computer 12 by loading program instructions from NVC 26 and/or HDA 28 with controller 20, and relaying the instructions to host computer 12. The instructions may then be stored in RAM 64 during operation. The software application may then allow the user to interact with CMS 48 in a variety of manners.

In one embodiment, through the software application, the user may select one or more of the caching modes for directing the cache writing operations of storage device 10. For example, the software application may provide a selectable menu in GUI 50, providing a list of the caching modes that are available in CMS 48. In this embodiment, when the software application is instantiated and stored in RAM 64, the software application may query storage device 10 for the caching modes available in CMS 48. Controller 20 may then transmit the list of the available caching modes to host computer 12 for display and selection by the user.

In an additional embodiment, the software application may allow the user to generate user-defined caching modes, as discussed above. Furthermore, the software application may allow the user to remove specific data from RAM cache 24 and/or NVC 26, such as by file name, block numbers, or by specifying that blocks with zero hits (or some other number) be purged from the given data cache(s). The display on GUI 50 may also provide information relating to statistical information of RAM cache 24 and/or NVC 26. For example, the program may display information such as the percentages of cache used, percentages of cache hits, cache hit rates, free and/or used cache volumes, available caching modes, selected caching modes, and the like. Moreover, in some embodiments, the program may allow the user to select applications and/or data to be cached. For example, GUI 50 may include menus for an application or data file that allow the user to selectively cache this application and/or data file. Additionally, the program may also identify applications and/or data files that are related to the application or data file already selected. The program may then prompt the user to cache the related data (e.g., dynamic link libraries).

As discussed above, storage device 10 allows a user to interactively control and monitor data caching operations. The inclusion of user-selectable caching modes accordingly allows the user to modify performance of storage device 10 and host computer 12 based on the particular needs and desires of the user. Furthermore, the use of a user interface (e.g., actuator 16) that is independent of host computer 12 is beneficial for situations in which selective data caching through software programs is generally unavailable (e.g., startup and shut down sequences). This increases the versatility of storage device 10 in accommodating the particular needs of individual users.

Figure 2:
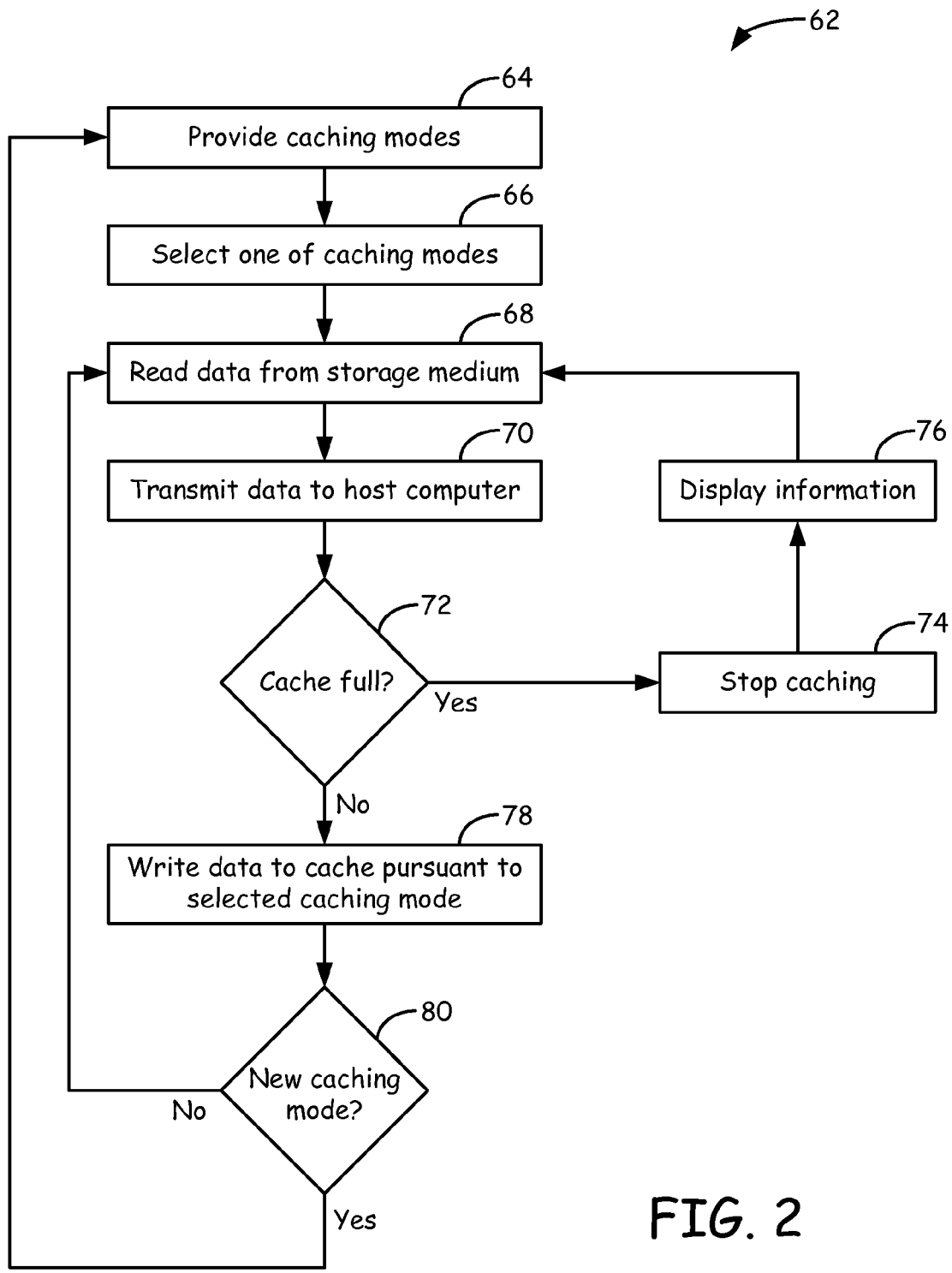
FIG. 2 is a flow diagram of a method of using a data storage device that includes user-selectable caching modes.

FIG. 2 is a flow diagram of method 62 for using a data storage device. The following discussion of method 62 is made with reference to storage device 10 (shown in FIG. 1) with the understanding that method 62 may be used with a variety of data storage devices. As shown, method 62 includes steps 64-80, and initially involves providing a plurality of caching modes for selectively operating controller 20 (step 64). For example, display unit 18 of storage device 10 and/or GUI 50 of host computer 12 may provide lists of available caching modes for the user to select from. When the user identifies a desired caching mode, the user then may select the given caching mode, such as with actuator 16 and/or through the software application in GUI 50 (step 66).

After the desired caching mode has been selected, subsequent read operations may be performed, where controller 20 reads data from one or more storage media. For example, controller 20 may initially determine whether the intended data is already cached in RAM cache 24 and/or NVC 26. If so, controller 20 may read the data from RAM cache 24 and/or NVC 26 and transmit one or more portions of the read data to host computer 12. Alternatively, if the intended data is not currently cached, controller 20 may read the data from HDA 28 (step 68) and transmit one or more portions of the read data to host computer 12 (step 70). At this point, controller 20 may also verify whether the intended data cache, such as NVC 26, is full (step 72). In alternative embodiments, this verification under step 72 may be performed prior to, or concurrent with, one or more of steps 64-70. In the event that NVC 26 is full, controller 20 may stop caching (step 74) and display information to the user that NVC 26 is full via display unit 18 and/or GUI 50 (step 76). The user may then either allow controller 20 to continue to read and transmit the data pursuant to steps 68-76 without caching, or have controller 20 purge one or more portions of the cached data in NVC 26. After purging, controller 20 may then continue to read and transmit the data pursuant to steps 68 and 70, and perform a cache writing operation, as discussed below under step 78.

If, pursuant to step 72, NVC 26 contains free data blocks 36, controller 20 may then copy and pin one or more portions of the data read from HDA 28 to NVC 26 in conformance with the algorithm of the selected caching mode (step 78). This data pinning allows the data to be retained in NVC 26 for subsequent reading operations. Steps 68-78 may then be repeated pursuant to the selected caching mode until the user decides to select a different caching mode (step 80). At this point, the user may review the list of available caching modes (step 64) and select a new caching mode for controller 20 to operate under (step 66). These steps of method 62 may then be repeated as desired by the user, thereby allowing the user to cache data in NVC 26 based on the user's particular needs.

Figure 3:
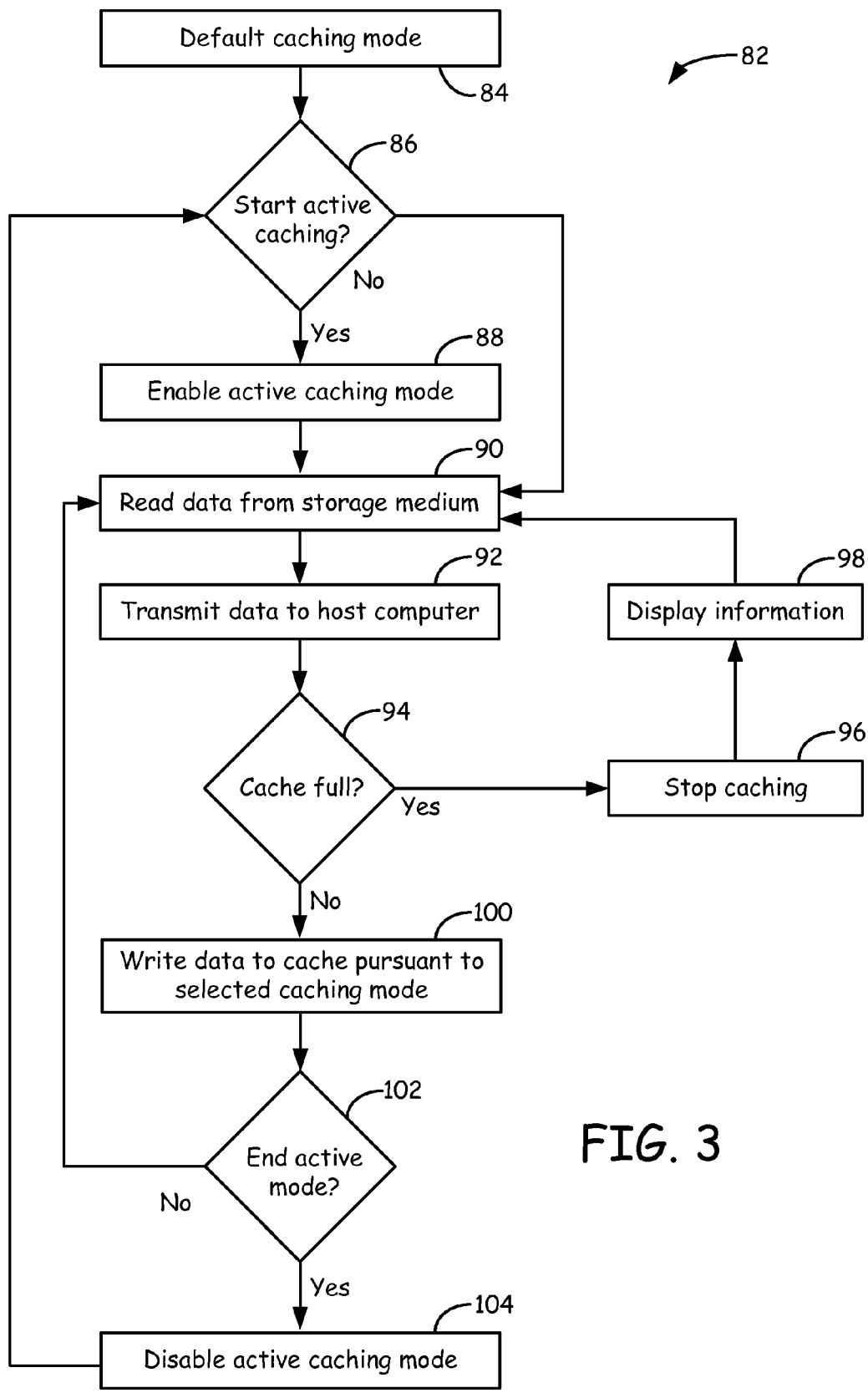
FIG. 3 is a flow diagram of a method of using a data storage device that includes an active caching mode.

FIG. 3 is a flow diagram of method 82 for using a storage device, and is an example of a suitable aspect of method 62 (shown in FIG. 2) that involves an active caching mode. As discussed above, the term "active caching mode" refers to a caching mode in which a controller copies and pins all data read from a storage medium to one or more data caches of the storage device.

The following discussion of method 82 is also made with reference to storage device 10 (shown in FIG. 1) with the understanding that method 82 may be used with a variety of data storage devices. As shown in FIG. 3, method 82 includes steps 84-104, and initially involves operating controller 20 under a default caching mode (i.e., a non-active caching mode) (step 84). If the user desires to copy and pin all data read from HDA 28 to one or more data caches (e.g., NVC 26) (step 86), the user may enable the active caching mode (step 88). As discussed above, the user may enable the active caching mode in a variety of manners, such as by pressing actuator 16.

Steps 90-100 of method 82 generally correspond to steps 68-78 of method 62. Accordingly, controller 20 may read data from one or more storage media. For example, controller 20 may initially determine whether the intended data is already cached in RAM cache 24 and/or NVC 26. If so, controller 20 may read the data from RAM cache 24 and/or NVC 26 and transmit one or more portions of the read data to host computer 12. Alternatively, if the intended data is not currently cached, controller 20 may read the data from HDA 28 (step 90) and transmits one or more portions of the read data to host computer 12 (step 92). At this point, controller 20 may also verify whether the intended data cache, such as NVC 26, is full (step 94). In alternative embodiments, this verification under step 94 may be performed prior to, or concurrent with, one or more of steps 84-92. In the event that NVC 26 is full, controller 20 may stop caching (step 96) and display information to the user via display unit 18 and/or GUI 50, as discussed above (step 98). The user may then either allow controller 20 to continue to read and transmit the data pursuant to steps 90-98 without caching, or have controller 20 purge one or more portions of the cached data in NVC 26. After purging, controller 20 may then continue to read and transmit the data pursuant to steps 90 and 92, and perform a cache writing operation pursuant to the active caching mode, as discussed below under step 100.

If, pursuant to step 94, NVC 26 contains free data blocks 36, controller 20 may then copy and pin all data read from HDA 28 to NVC 26, in conformance with the active caching mode (step 100). This data pinning allows the data to be retained in NVC 26 for subsequent reading operations. Steps 90-100 may then be repeated pursuant to the active caching mode until the user desires to stop the active caching (step 102). At this point, the user may disable the active caching mode, such as by pressing actuator 16 again (step 104). This may switch operation of controller 20 back to the default caching mode, or another non-active caching mode as desired by the user.

While under the non-active caching mode (and if the user does not desire to re-enable the active caching mode, pursuant to step 86), steps 90-104 may then be repeated under the selected non-active caching mode (e.g., a default caching mode). Method 82 accordingly allows cached data to be retained in NVC 26 for subsequent reading operations based on the particular needs of the user. As discussed above, this method is particularly suitable for caching startup sequence data when applied in combination with a user interface (e.g., actuator 16) that is independent of host computer 12.

Although the present invention has been described with reference to preferred embodiments, workers skilled in the art will recognize that changes may be made in form and detail without departing from the spirit and scope of the invention.

The invention claimed is:

1. A data storage device comprising:
   at least one non-volatile storage medium;
   at least one data cache;
   a controller configured to perform reading and writing operations between the at least one non-volatile storage medium and a host computer system, and further configured to perform cache pinning operations from the at least one non-volatile storage medium to the at least one data cache; and
   a cache management system comprising at least one user-selectable caching mode configured to direct the cache pinning operations performed by the controller.

2. The data storage device of claim 1, wherein the at least one user-selectable caching mode comprises an active caching mode.

3. The data storage device of claim 1, and further comprising a user interface configured to allow a user to select the at least one user-selectable caching mode.

4. The data storage device of claim 3, and further comprising a housing for retaining the at least one non-volatile storage medium, the at least one data cache, the controller, and the user interface.

5. The data storage device of claim 1, and further comprising a display unit configured to display information relating the cache pinning operations performed by the controller.

6. The data storage device of claim 1, wherein the at least one user-selectable caching mode is selectable in a manner that is independent of the host computer system.

7. The data storage device of claim 1, wherein the at least one data cache comprises a non-volatile storage medium.

8. The data storage device of claim 4, wherein the user interface comprises a push-button interface located on the exterior of the housing.

9. A data storage device comprising:
   at least one non-volatile storage medium;
   at least one data cache;
   a controller configured to perform cache pinning operations for data from the at least one non-volatile storage medium to the at least one data cache; and
   a user interface in communication with the controller and configured to enable and disable at least one caching mode that is configured to direct the cache pinning operations performed by the controller.

10. The data storage device of claim 9, and further comprising a housing for retaining the at least at least one non-volatile storage medium, the at least one data cache, the controller, and the user interface.

11. The data storage device of claim 9, wherein the user interface is configured to operate in a manner that is independent of a host computer system engaged with the data storage device.

12. The data storage device of claim 9, wherein the at least one caching mode comprises a caching mode selected from the group consisting of preset caching modes, user-defined caching modes, system-modified caching modes, and combinations thereof.

13. The data storage device of claim 9, wherein the at least one data cache comprises a non-volatile storage medium.

14. The data storage device of claim 9, wherein the controller is also in communication with a host computer system configured to instantiate a software application that is also configured to enable and disable the at least one caching mode.

15. A method for using a data storage device, the method comprising:
   providing a plurality of caching modes for performing cache writing operations from at least one non-volatile storage medium of the data storage device to at least one data cache of the data storage device;
   receiving a selection of one of the plurality of caching modes from a user interface;
   reading data blocks from the at least one non-volatile storage medium; and
   writing at least a portion of the read data blocks to the at least one data cache pursuant to the selected caching mode.

16. The method of claim 15, wherein the selected caching mode comprises an active caching mode, and wherein writing at least the portion of the read data blocks to the at least one data cache comprises writing each of the read data blocks to the at least one data cache.

17. The method of claim 15, and further comprising displaying information relating the cache writing operations.

18. The method of claim 15, wherein the selection of the caching mode is received in a manner that is independent of a host computer system engaged with the data storage device.

19. The method of claim 15, wherein the user interface is a component of the data storage device.

20. The method of claim 15, wherein writing at least the portion of the read data blocks to the at least one data cache is performed at least partially during a startup sequence of a host computer system engaged with the data storage device.

* * * * *